(12) United States Patent
Bye

(10) Patent No.: US 10,698,534 B2
(45) Date of Patent: Jun. 30, 2020

(54) APPLYING A SIGNAL TO A TOUCH SENSOR

(71) Applicant: Atmel Corporation, Chandler, AZ (US)

(72) Inventor: David K. Bye, Alton (GB)

(73) Assignee: Atmel Corporation, Chandler, AZ (US)

( * ) Notice: Subject to any disclaimer, the term of this patent is extended or adjusted under 35 U.S.C. 154(b) by 0 days.

(21) Appl. No.: 16/529,466

(22) Filed: Aug. 1, 2019

(65) Prior Publication Data

US 2019/0354233 A1 Nov. 21, 2019

Related U.S. Application Data

(63) Continuation of application No. 15/419,745, filed on Jan. 30, 2017, now Pat. No. 10,423,276.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04108* (2013.01)

(58) Field of Classification Search
CPC .................. G06F 3/0418; G06F 3/044; G06F 2203/04108; G06F 2203/04112; G06F 3/0412
See application file for complete search history.

(56) References Cited

U.S. PATENT DOCUMENTS 7,663,607 B2 2/2010 Hotelling et al.
7,864,503 B2 1/2011 Chang
7,875,814 B2 1/2011 Chen et al.
7,920,129 B2 4/2011 Hotelling et al.
8,031,094 B2 10/2011 Hotelling et al.
(Continued)

FOREIGN PATENT DOCUMENTS

WO 201212247 A2 9/2012

OTHER PUBLICATIONS

Myers, S. A. et al., "Electronic Devices With Concave Displays," U.S. Appl. No. 61/454,936, filed Mar. 21, 2011, 23 pages.
(Continued)

*Primary Examiner* — Jonathan A Boyd
(74) *Attorney, Agent, or Firm* — Baker Botts L.L.P.

(57) ABSTRACT

In one embodiment, a non-transitory computer-readable medium comprising logic is configured to, when executed by one or more processors, cause the one or more processors to perform operations comprising measuring samples from a touch sensor. Each sample is measured by determining, based on a first pattern of polarities, a polarity of a charging signal to be applied to an electrode of the touch sensor, the first pattern of polarities based on a signal associated with a noise source; applying the charging signal to the electrode, the charging signal, as applied, having the polarity determined based on the first pattern of polarities; and measuring a received signal from the touch sensor, the received signal resulting, at least in part, from the charging signal applied to the electrode. The operations comprise determining whether a touch event has occurred at the electrode by analyzing the received signals from the samples.

20 Claims, 6 Drawing Sheets

(56) References Cited

U.S. PATENT DOCUMENTS

| | | |
|---|---|---|
| 8,031,174 B2 | 10/2011 | Hamblin et al. |
| 8,040,326 B2 | 10/2011 | Hotelling et al. |
| 8,049,732 B2 | 11/2011 | Hotelling et al. |
| 8,179,381 B2 | 5/2012 | Frey et al. |
| 8,217,902 B2 | 7/2012 | Chang et al. |
| 8,723,824 B2 | 5/2014 | Myers et al. |
| 2008/0158178 A1* | 7/2008 | Hotelling ................ G06F 3/044 345/173 |
| 2008/0309635 A1 | 12/2008 | Matsuo |
| 2009/0315854 A1 | 12/2009 | Matsuo |
| 2012/0242588 A1 | 9/2012 | Myers et al. |
| 2012/0242592 A1 | 9/2012 | Rothkopf et al. |
| 2012/0243151 A1 | 9/2012 | Lynch |
| 2012/0243719 A1 | 9/2012 | Franklin et al. |
| 2013/0076612 A1 | 3/2013 | Myers |

OTHER PUBLICATIONS

Lynch, S. B., "Electronic Devices With Convex Displays," U.S. Appl. No. 61/454,950, filed Mar. 21, 2011, 28 pages.

Rothkopf, F. R. et al., "Electronic Devices With Flexible Displays," U.S. Appl. No. 61/454,894, filed Mar. 21, 2011, 41 pages.

\* cited by examiner

APPLYING A SIGNAL TO A TOUCH SENSOR

RELATED APPLICATION

This application is a continuation under 35 U.S.C. § 120 of U.S. application Ser. No. 15/419,745, filed Jan. 30, 2017 and entitled Applying a Signal to a Touch Sensor, incorporated herein by reference.

TECHNICAL FIELD

This disclosure generally relates to touch sensors.

BACKGROUND

According to an example scenario, a touch sensor detects the presence and position of an object (e.g., a user's finger or a stylus) within a touch-sensitive area of touch sensor array overlaid on a display screen, for example. In a touch-sensitive-display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor.

There are a number of different types of touch sensors, such as for example resistive touch sensors, surface acoustic wave touch sensors, and capacitive touch sensors. In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller processes the change in capacitance to determine the position of the change of capacitance within the touch sensor (e.g., within a touch sensor array of the touch sensor).

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

In one embodiment, a non-transitory computer-readable medium comprising logic is configured to, when executed by one or more processors, cause the one or more processors to perform operations comprising measuring samples from a touch sensor. Each sample is measured by determining, based on a first pattern of polarities, a polarity of a charging signal to be applied to an electrode of the touch sensor, the first pattern of polarities based on a signal associated with a noise source; applying the charging signal to the electrode, the charging signal, as applied, having the polarity determined based on the first pattern of polarities; and measuring a received signal from the touch sensor, the received signal resulting, at least in part, from the charging signal applied to the electrode. The operations comprise determining whether a touch event has occurred at the electrode by analyzing the received signals from the samples.

Figure 1:
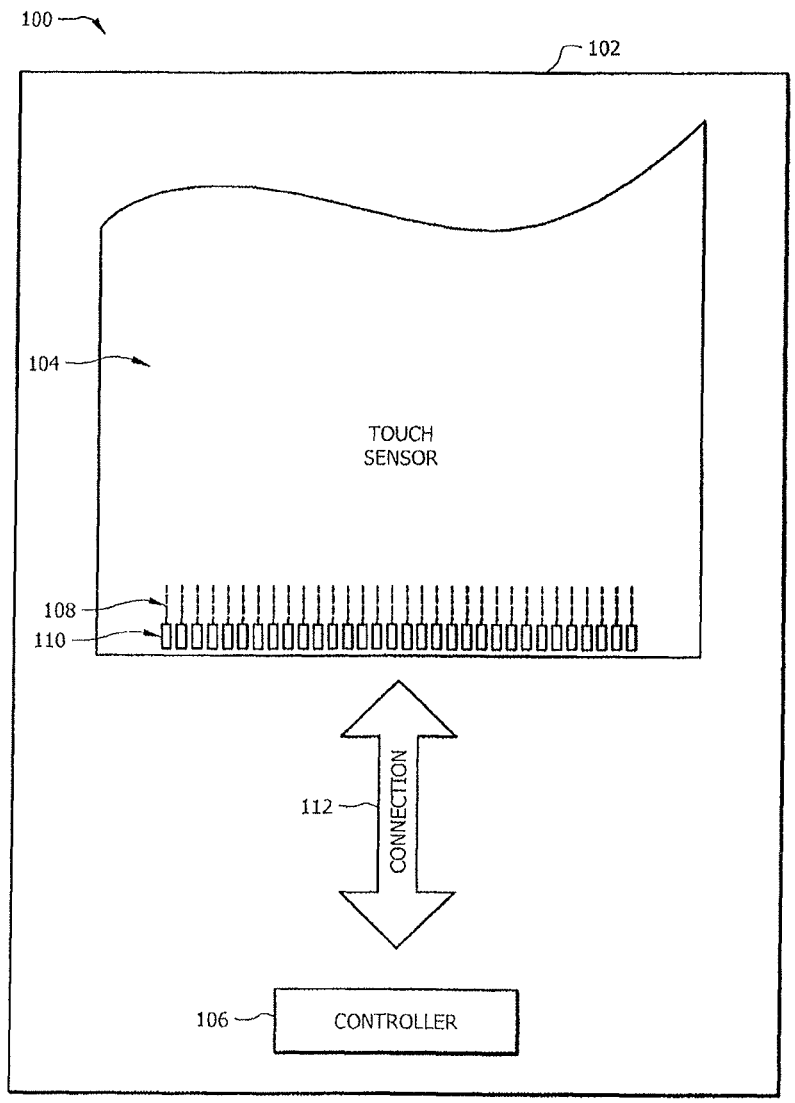
FIG. 1 illustrates an example system that includes a device which includes a touch sensor, according to an embodiment of the present disclosure.

FIG. 1 illustrates an example system 100 that includes a device 102. Device 102 includes a touch sensor 104, according to an embodiment of the present disclosure. In an embodiment, Device 102 further includes touch sensor controller 106. Touch sensor 104 includes connecting lines 108 and connection pads 110. In some embodiments, connecting lines 108 electrically couple electrodes of touch sensor 104 to connection pads 110. Connecting lines 108 may extend around the perimeter of a touch sensitive area of touch sensor 104. According to an embodiment of the present disclosure, connecting lines 108 conduct an electrical signal between a touch sensitive area of touch sensor 104 and connection pads 110. In an embodiment, touch sensor 104 is connected to touch sensor controller 106 by connection 112. In some embodiments, connection 112 is an electrical interface between connection pads 110 of touch sensor 104 and corresponding connection pads on touch sensor controller 106. Connection 112 may consist of an electrically conductive material spanning the distance between connection pads 110 and the corresponding connection pads on touch sensor controller 106. In certain other embodiments, touch sensor controller 106 is connected to connection pads 110 without a connection 112.

Touch sensor 104 includes one or more touch-sensitive areas. In one embodiment, touch sensor 104 includes an array of electrodes disposed on one or more substrates, which may be made of a dielectric material. Reference to a touch sensor may encompass both the electrodes of touch sensor 104 and the substrate(s) on which they are disposed.

Alternatively, reference to a touch sensor may encompass the electrodes of touch sensor 104, but not the substrate(s) on which they are disposed.

In one embodiment, an electrode is an area of conductive material forming a shape, such as for example a disc, square, rectangle, thin line, other shape, or a combination of these shapes. One or more cuts in one or more layers of conductive material may (at least in part) create the shape of an electrode, and the area of the shape may (at least in part) be bounded by those cuts. In one embodiment, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a touch sensor 104 constitute, in whole or in part, one or more macro-features of touch sensor 104. One or more characteristics of the implementation of those shapes (such as, for example, the conductive materials, fills, or patterns within the shapes) constitute in whole or in part one or more micro-features of touch sensor 104. One or more macro-features of touch sensor 104 may determine one or more characteristics of its functionality, and one or more micro-features of touch sensor 104 may determine one or more optical features of touch sensor 104, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor 104. For example, the mechanical stack may include a first layer of optically clear adhesive (OCA) beneath a cover panel. The cover panel may be clear and made of a resilient material for repeated touching, such as for example glass, polycarbonate, or poly (methyl methacrylate) (PMMA). This disclosure contemplates cover panel being made of any material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor 104 and touch sensor controller 106. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of touch sensor 104 may be made of polyethylene terephthalate (PET) or another material. This disclosure contemplates any substrate with portions made of any material(s). In one embodiment, one or more electrodes in touch sensor 104 are made of ITO in whole or in part. Additionally or alternatively, one or more electrodes in touch sensor 104 are made of fine lines of metal or other conductive material. For example, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any electrodes made of any materials.

Touch sensor controller 106 is connected to touch sensor 104 by connection 112 according to an embodiment of the present disclosure. In an embodiment, touch sensor controller 106 is electrically coupled to touch sensor 104 through connection pads 110. In some embodiments, touch sensor controller 106 includes one or more memory units and one or more processors. In certain of those embodiments, the one or more memory units and the one or more processors are electrically interconnected so that they interdependently operate. The one or more memory units and the one or more processors are electrically coupled to touch sensor 104, allowing touch sensor 106 to send and receive electrical signal to and from touch sensor 104.

In one embodiment, touch sensor 104 implements a capacitive form of touch sensing. In a mutual-capacitance implementation, touch sensor 104 may include an array of drive and sense electrodes forming an array of capacitive nodes. A drive electrode and a sense electrode may form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A charging signal, which is a pulsed or alternating voltage, applied to the drive electrode (by touch sensor controller 106) induces a charge on the sense electrode, and the amount of charge induced is susceptible to external influence (such as a touch or the proximity of an object). When an object touches or comes within proximity of the capacitive node, a change in capacitance may occur at the capacitive node and touch sensor controller 106 measures the change in capacitance. By measuring changes in capacitance throughout the array, touch sensor controller 106 determines the position of the touch or proximity within touch-sensitive areas of touch sensor 104.

In a self-capacitance implementation, touch sensor 104 may include an array of electrodes of a single type that may each form a capacitive node. When an object touches or comes within proximity of the capacitive node, a change in self-capacitance may occur at the capacitive node and touch sensor controller 106 measures the change in capacitance, for example, as a change in the amount of charge induced by the charging signal to raise the voltage at the capacitive node by a predetermined amount. As with a mutual-capacitance implementation, by measuring changes in capacitance throughout the array, touch sensor controller 106 determines the position of the touch or proximity within touch-sensitive areas of touch sensor 104. This disclosure contemplates any form of capacitive touch sensing.

In one embodiment, one or more drive electrodes together form a drive line running horizontally or vertically or in other orientations. Similarly, in one embodiment, one or more sense electrodes together form a sense line running horizontally or vertically or in other orientations. As one particular example, drive lines run substantially perpendicular to the sense lines. Reference to a drive line may encompass one or more drive electrodes making up the drive line, and vice versa. Reference to a sense line may encompass one or more sense electrodes making up the sense line, and vice versa.

In one embodiment, touch sensor 104 includes drive and sense electrodes disposed in a pattern on one side of a single substrate. In such a configuration, a pair of drive and sense electrodes capacitively coupled to each other across a space between them form a capacitive node. As an example self-capacitance implementation, electrodes of a single type are disposed in a pattern on a single substrate. In addition or as an alternative to having drive and sense electrodes disposed in a pattern on one side of a single substrate, touch sensor 104 may have drive electrodes disposed in a pattern on one side of a substrate and sense electrodes disposed in a pattern on another side of the substrate. Moreover, touch sensor 104 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, a change in capacitance at a capacitive node of touch sensor 104 may indicate a touch or proximity input at the position of the capacitive node. Touch sensor controller 106 detects and processes the change in capacitance to determine the presence and position of the touch or proximity input. In one embodiment, touch sensor controller 106 then communicates information about the touch or proximity input to one or more other components (such as one or more central processing units (CPUs)) of device 102, which includes touch sensor 104 and touch sensor controller 106, and which may respond to the touch or proximity input by initiating a function of the device (or an application running on the device). Although this disclosure describes a particular touch sensor controller 106 having particular functionality with respect to a particular device and a particular touch sensor 104, this disclosure contemplates other touch sensor controllers having any functionality with respect to any device and any touch sensor.

In one embodiment, touch sensor controller 106 is implemented as one or more integrated circuits (ICs), such as for example general-purpose microprocessors, microcontrollers, programmable logic devices or arrays, application-specific ICs (ASICs). Touch sensor controller 106 comprises any combination of analog circuitry, digital logic, and digital non-volatile memory. In one embodiment, touch sensor controller 106 is disposed on a flexible printed circuit (FPC) bonded to the substrate of touch sensor 104, as described below. The FPC may be active or passive. In one embodiment, multiple touch sensor controllers 106 are disposed on the FPC.

In an example implementation, touch sensor controller 106 includes a processor unit, a drive unit, a sense unit, and a storage unit. In such an implementation, the drive unit supplies drive signals to the drive electrodes of touch sensor 104, and the sense unit senses charge at the capacitive nodes of touch sensor 104 and provides measurement signals to the processor unit representing capacitances at the capacitive nodes. The processor unit controls the supply of drive signals to the drive electrodes by the drive unit and processes measurement signals from the sense unit to detect and process the presence and position of a touch or proximity input within touch-sensitive areas of touch sensor 104. The processor unit may also track changes in the position of a touch or proximity input within touch-sensitive areas of touch sensor 104. The storage unit stores programming for execution by the processor unit, including programming for controlling the drive unit to supply drive signals to the drive electrodes, programming for processing measurement signals from the sense unit, and other programming. Although this disclosure describes a particular touch sensor controller 106 having a particular implementation with particular components, this disclosure contemplates touch sensor controller having other implementations with other components.

Connecting lines 108, formed in one example of conductive material disposed on the substrate of touch sensor 104, couple the drive or sense electrodes of touch sensor 104 to connection pads 110, also disposed on the substrate of touch sensor 104. As described below, connection pads 110 facilitate coupling of connecting lines 108 to touch sensor controller 106. Connecting lines 108 may extend into or around (e.g., at the edges of) touch-sensitive areas of touch sensor 104. In one embodiment, particular connecting lines 108 provide drive connections for coupling touch sensor controller 106 to drive electrodes of touch sensor 104, through which the drive unit of touch sensor controller 106 supplies drive signals to the drive electrodes, and other connecting lines 108 provide sense connections for coupling touch sensor controller 106 to sense electrodes of touch sensor 104, through which the sense unit of touch sensor controller 106 senses charge at the capacitive nodes of touch sensor 104.

Connecting lines 108 are made of fine lines of metal or other conductive material. For example, the conductive material of connecting lines 108 may be copper or copper-based and have a width of approximately 100 μm or less. As another example, the conductive material of connecting lines 108 may be silver or silver-based and have a width of approximately 100 μm or less. In one embodiment, connecting lines 108 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to connecting lines 108, touch sensor 104 may include one or more ground lines terminating at a ground connector (which may be a connection pad 110) at an edge of the substrate of touch sensor 104 (similar to connecting lines 108).

Connection pads 110 may be located along one or more edges of the substrate, outside a touch-sensitive area of touch sensor 104. As described above, touch sensor controller 106 may be on an FPC. Connection pads 110 may be made of the same material as connecting lines 108 and may be bonded to the FPC using an anisotropic conductive film (ACF). In one embodiment, connection 112 includes conductive lines on the FPC coupling touch sensor controller 106 to connection pads 110, in turn coupling touch sensor controller 106 to connecting lines 108 and to the drive or sense electrodes of touch sensor 104. In another embodiment, connection pads 110 are connected to an electromechanical connector (such as, for example, a zero insertion force wire-to-board connector). Connection 112 may or may not include an FPC. This disclosure contemplates any connection 112 between touch sensor controller 106 and touch sensor 104.

Figure 2:
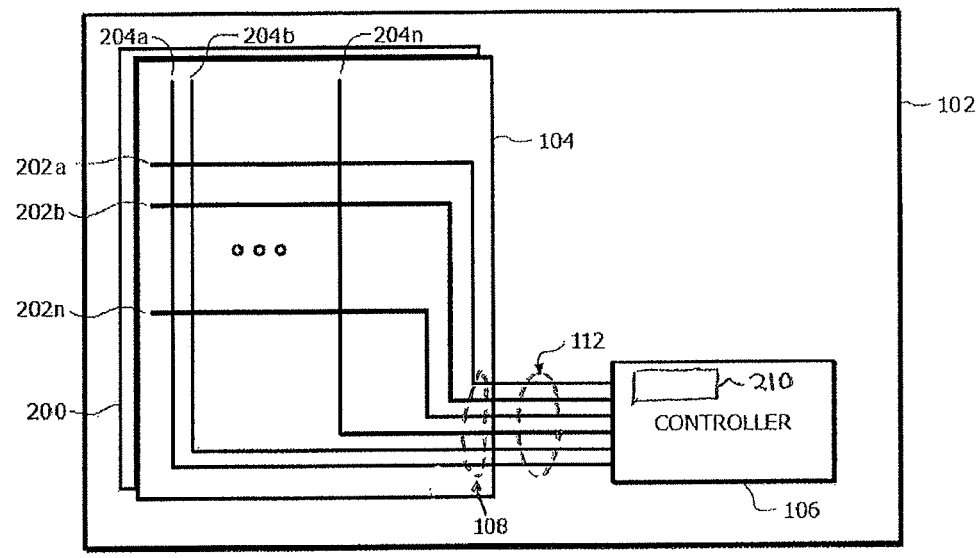
FIG. 2 illustrates an example of a device that includes a touch sensor and controller according to an embodiment of the present disclosure.

FIG. 2 illustrates an example of a device 102 that includes a touch sensor 104 and a controller 106 according to an embodiment of the present disclosure. In the example of FIG. 2, touch sensor 104 overlays display 200, which represents any type of electronic display.

As shown in FIG. 2, in one example touch sensor 104 includes one or more row electrodes, represented by row electrodes 202a-202n. This disclosure contemplates any number of row electrodes 202. Similarly, in one example touch sensor 104 includes one or more column electrodes, represented by column electrodes 204a-204n. This disclosure contemplates any number of column electrodes 204.

Row electrodes 202a-202n and column electrodes 204a-204n of touch sensor 104 are electrically coupled to touch sensor controller 106 by connecting lines 108 and connections 112. As described in relation to FIG. 1, in some embodiments connecting lines 108 interface with connections 112 through connection pads 110. In the illustrated example, row electrodes 202 and column electrodes 204 are disposed on a substrate of touch sensor 104 in a grid pattern, where each intersection of respective row electrodes 202 and column electrodes 204 define a capacitive touch node. Although row electrodes 202 and column electrodes 204 are disposed in a grid pattern in which row electrodes 202 and column electrodes 204 intersect in plan view, the respective electrodes at an intersection are physically separated (e.g., by an intervening dielectric material disposed between row electrodes 202 and column electrodes 204) at least at the locations of the intersections. In an embodiment, row electrodes 202 and column electrodes 204 are respectively positioned to allow a capacitive coupling during operation of device 102. Example details of such an arrangement are described in greater detail below with respect to FIG. 4.

Touch sensor 104 and display 200 are shown in a plan view. Display 200 contains pixels and circuitry for displaying an image. Touch sensor 104 is arranged on display 200 so that touch measurement information calculated at touch sensor controller 106 can be correlated to a certain portion of the image displayed on display 200. Although in one embodiment, electrodes 202 and 204 are disposed between display 200 and a cover panel, the optical quality of display 200 is not significantly reduced due to the material composition and shape of electrodes 202 and 204. In another embodiment, electrodes 202 and 204 are integrated into display 200.

In an embodiment, touch sensor controller 106 measures a portion or all of electrodes 202 and 204 to determine whether an object is capacitively coupled to one or more electrodes 202 or 204. For example, in the illustrated embodiment, controller 106 includes a measurement circuit 210 configured to measure a characteristic (e.g., a voltage) from a portion or all of electrodes 202 and 204 to determine whether an object is capacitively coupled to one or more electrodes 202 and/or 204. In certain embodiments, touch sensor 104, comprising row electrodes 202, column electrodes 204, and connecting lines 108, is connected to measurement circuit 210 of touch sensor controller 106 (e.g., through connection pads 110, shown in FIG. 1, and connections 112). To measure the characteristic from an electrode 202 or 204, touch sensor controller 106 (e.g., measurement circuit 210) applies a charging signal to an electrode 202 or 204, and measures characteristics of a signal received from touch sensor 104 in response to the applied charging signal. In some embodiments, touch sensor controller 106 (e.g., measurement circuit 210) receives a signal from touch sensor 104 indicating electrical characteristics of an electrode 202 or 204 (either the same electrode 202 or 204 or a different electrode 202 or 204, depending on whether self-capacitance or mutual capacitance techniques are used) after the charging signal induces a charge on an electrode 202 or 204. Additionally or alternatively, touch sensor controller 106 (e.g., measurement circuit 210) may measure the time required for the received signal from touch sensor 104 to indicate that the electrical characteristics of the electrode 202 or 204 have reached a predetermined threshold. Although the present disclosure describes particular techniques for touch sensor controller 106 (e.g., measurement circuit 210) to determine whether an object is capacitively coupled to one or more electrodes 202 or 204 are described, the present disclosure contemplates touch sensor controller 106 (e.g., measurement circuit 210) using any suitable technique for determining whether an object is capacitively coupled to one or more electrodes 202 or 204.

In some embodiments, electrodes 202 and 204, when not capacitively coupled to an object, have a certain inherent capacitance, which allows touch sensor controller 106 to determine the expected electrical characteristics of the electrode 202 or 204 after the charge is induced. In some embodiments, the expected electrical characteristics are stored in a lookup table in one or more memory units of touch sensor controller 106. In certain other embodiments, touch sensor controller 106 executes an algorithm stored in one or more memory units, which dynamically measures the electrical characteristics of each electrode to take into account certain environmental factors. In one embodiment, when capacitively coupled to an object, electrodes 202 and 204 appear to increase capacitance as measured by touch sensor controller 106. The increased apparent capacitance results in the electrode having different electrical characteristics when the charging signal is applied as compared to an electrode that is not coupled to the object. These different electrical characteristics are measured by touch sensor controller 106 as a received signal from touch sensor 104 that is different than the threshold predetermined by touch sensor 106. These different electrical characteristics indicate to touch sensor controller 106 that an object is capacitively coupled with the electrode being measured. In some embodiments, electrical characteristics may include voltage at the electrode compared to a ground voltage, current at the electrode, or any other suitable electrical characteristics.

Figure 3:
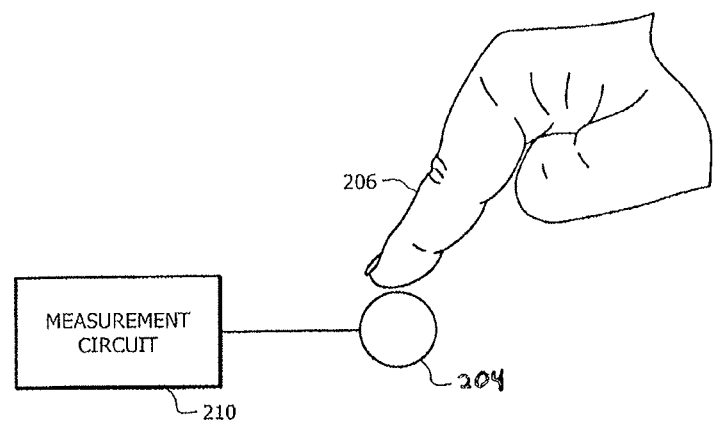
FIG. 3 illustrates a touch sensor electrode and measurement circuit of an example device according to an embodiment of the present disclosure.

FIG. 3 illustrates a touch sensor electrode 208 and measurement circuit 210 of an example device according to an embodiment of the present disclosure. In the example of FIG. 3, an electrode 208 (e.g., one of electrodes 202 and 204) of touch sensor 104 is coupled to a measurement circuit 210 of touch sensor controller 106. As described below, electrode 208 forms a capacitance to ground that is distributed in free space. In one embodiment, the capacitance to ground includes multiple elements, such as for example, capacitance of the tracks in the silicon, tracks on the printed circuit board (PCB), electrodes 208 made of conductive material (ITO, copper mesh, etc.), or an object 206 providing an input to electrodes 208. For example, object 206 may be part of a human body, e.g., finger or palm, or a stylus. Electrode 208 has capacitive coupling to ground through the surrounding objects that are galvanically or capacitively connected to ground. As described above, measurement circuit 210 of touch sensor controller 106 transmits a drive signal and senses a signal indicative of a touch or proximity input from object 206, such as for example a finger, through electrode 208. In one embodiment, measurement circuit 210 of touch sensor controller 106 generates the drive signal transmitted by electrode 208 and senses the capacitance to ground. The capacitance of the surrounding material includes at least in part, the capacitance between electrode 208 and ground with object 206 providing the touch or proximity input. For example, the capacitance provided by object 206 providing the touch or proximity input may add 5-10% of the capacitance sensed by electrode 208.

Figure 4:
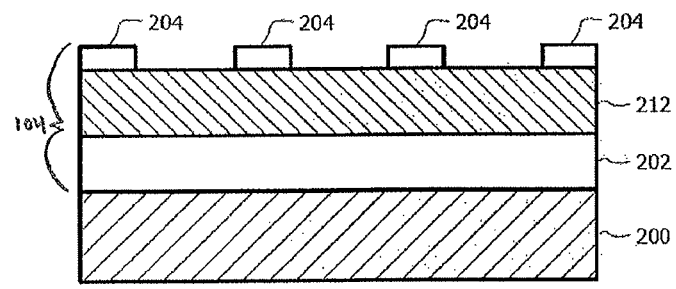
FIG. 4 illustrates a cross-sectional view of a display and touch sensor according to an embodiment of the present disclosure.

FIG. 4 illustrates a cross-sectional view of display 200 and touch sensor 104 according to an embodiment of the present disclosure. In the illustrated example, touch sensor 104 overlays display 200 and comprises row electrodes 202, column electrodes 204, and substrate 212 between row electrodes 202 and column electrodes 204. Row electrodes 202 overlay display 200, and column electrodes 204 overlay row electrodes 202. Row electrodes 202 and column electrodes 204 are separated by an intervening substrate 212 of touch sensor 104. Substrate 212 may be comprised of a dielectric material. Although row electrodes 202 and column electrodes 204 are shown in a grid pattern with column electrodes 204 overlaying row electrodes 202, there are many configurations of electrodes 202 and 204 that could be substituted in place of the configuration shown in FIG. 4.

In a mutual-capacitance example, touch sensor controller 106 drives a row electrode 202 (e.g., 202a). Driven row electrode 202a capacitively couples with column electrodes 204. As shown in FIG. 2, each column electrode 204a-n is electrically coupled to touch sensor controller 106 through a connecting line 108 and connection 112. Touch sensor controller 106 receives a signal from column electrodes 204a-n, which are capacitively coupled to driven row electrode 202a. When object 206 (shown in FIG. 3), is in contact or proximity of a touch sensitive portion of touch sensor 104, the capacitive coupling between driven row electrode 202a and an influenced column electrode 204a is altered. This altered capacitive coupling is received by touch sensor controller 106 as a signal from touch sensor 104 (e.g., from a measured column electrode 204a) representing the electrical characteristics of the influenced column electrode 204a.

In a self-capacitance example, touch sensor controller 106 drives an electrode 202 or 204 with a charging signal and receives a signal from touch sensor 104 (e.g., from the driven electrode 202 or 204) representing the electrical characteristics of the influenced electrode 202 or 204. In one example, a touch sensor controller (e.g., touch sensor controller 106 shown in FIGS. 1 and 2) drives a column electrode 204. Touch sensor controller 106 is not limited to driving a column electrode 204, but may drive a row electrode 202 or any electrode of touch sensor 104. In one particular example, driven column electrode 204b forms a capacitance to ground. As shown in FIG. 2, each column electrode 204a-n is electrically coupled to touch sensor controller 106 through a connecting line 108 and connection 112. Touch sensor controller 106 receives a signal from the driven column electrode 204b, which indicates the capacitance of driven column electrode 204b to ground. When an object (e.g., object 206 of FIG. 3) is in contact or within a detection range of a touch sensitive portion of touch sensor 104, the capacitive coupling between driven column electrode 204b and ground is altered. This altered capacitive coupling is detected by touch sensor controller 106 through a signal from touch sensor 104 representing the electrical characteristics of the influenced driven column electrode 204b, as described above in relation to FIG. 2.

However, in some embodiments, noise from one or more environmental sources (e.g., radio frequency (RF) interference, power supplies, inverters) can also affect a signal measured by touch sensor controller 106 from an electrode 202 or 204. For example, the signal measured by touch sensor controller 106 from an electrode 202 or 204 may include a noise component. For purposes of this description, a signal output by electrodes 202 or 204 in a noiseless environment is referred to as signal S. In a real world operating environment, an additional noise component N may accompany signal S, resulting in a received signal R=S+N at touch sensor controller 106. Additional noise component N includes noise from one or more sources. As just one example, additional noise component N may include the combination of electromagnetic interference from one or more sources. Certain portions of noise component N may be random in nature, certain other portions of noise component N may be consistent and substantially direct current signals and certain other portions of noise component N may be periodic in nature. Although additional noise component N is described as including particular types of noise, the present disclosure contemplates additional noise component N including other types of noise from any suitable source or combination of sources.

In one embodiment, random noise is reduced or eliminated by measuring multiple signal samples from one or more electrodes 202a-n and 204a-n. Within a certain time period, which may be, for example, on the order of 10 microseconds per sample, touch sensor controller 106 applies a charging signal to an electrode 202 or 204 and measures the response signal from touch sensor 104. The measured response signal is a measured sample, and, as further described in relation to FIG. 5A, may include a measured voltage, time period, or any other characteristic of the received signal. Touch sensor controller 106 repeats this application and measurement cycle, also called integration, a number of times to accumulate a predetermined number of samples from the electrode 202 or 204.

Then, after measuring the samples, touch sensor controller 106 analyzes the samples to obtain a sampled result for the electrode 202 or 204. In one example, touch sensor controller 106 sums the samples and divides by the number of samples to obtain the sampled result. In one embodiment, if one of the samples is influenced by a random noise component, the effect of the random noise component is reduced or eliminated by measuring multiple samples, as the effect is spread across all of the samples when touch sensor controller 106 averages the samples in one example. In an example of an eight-sample measurement, touch sensor controller 106 applies a charging signal on an electrode and measures the received signal eight times in order to determine whether an object has coupled with the electrode. The eight samples of the received signal are summed together and the resulting sum is divided by eight to obtain the sampled result for the measured electrode. Touch sensor controller 106 is not limited to an eight-sample measurement, but may measure any number of samples. Although the analysis conducted by touch sensor controller 106 is described as an arithmetic mean, or averaging, analysis of the samples, touch sensor controller 106 is not limited to averaging the samples, and may obtain the sampled result using any algorithm that reduces the effect of random noise on the sampled result.

In some embodiments, touch sensor controller 106 reduces or eliminates consistent noise while also reducing or eliminating random noise by alternating the polarity of the applied charging signal between positive and negative polarity for each sample of a multiple sample measurement and inverting the resulting signal from negative polarity samples. Two examples describing these alternating polarity samples are shown in Tables 1A and 1B, illustrated below. In the example of Table 1A, the charging signal ("Signal from Electrode") alternates between S and −S, and the resulting signal is inverted (Integration Polarity is "−") when the charging signal is negative polarity (−S).

The samples where the charging signal induces a positively polarized charge are called positive integration, and the samples where the charging signal induces a negatively polarized charge are called negative integration. In an example of a two-sample measurement, touch sensor controller 106 performs a positive integration for the first sample and a negative integration for the second sample. In certain embodiments, the polarity of the charging signal S matches the integration polarity. Touch sensor controller 106 receives the signal from touch sensor 104 for the positive integration first sample. The received signal for the first sample can be represented as R1=S+N, where S is the signal from the capacitive coupling of the electrode, and N is a direct current consistent noise component.

Touch sensor controller 106 also receives the signal from touch sensor 104 for the negative integration second sample. The received signal for the second sample can be represented as R2=−S+N, where −S is the negatively polarized signal from the capacitive coupling of the electrode, and N is the unchanged direct current consistent noise component. In one embodiment, touch sensor controller 106 adds the positively integrated samples and subtracts the negatively integrated samples, and divides by the number of samples. For two samples, this averaging algorithm can be represented as Avg=(R1−R2)/2, resulting in ((S+N)−(−S+N))/2.

In another embodiment, the averaging algorithm first inverts the negatively integrated samples, and then adds all of the samples and divides by the number of samples taken. For two samples, this averaging algorithm can be represented as Avg=(R1+(−R2))/2, resulting in ((S+N)+(S−N))/2. As a result, the direct current noise components cancel out, and the averaging results in a sampled result of S, the signal from the capacitive coupling of the electrode.

As shown in Tables 1A-1B, below, a similar result occurs in an eight-sample measurement, regardless of the polarity of the consistent noise.

TABLE 1A

| Synchronization signal pulse | Samples | | | | | | | | |
|---|---|---|---|---|---|---|---|---|---|
| | 1 | 2 | 3 | 4 | 5 | 6 | 7 | 8 | SUM |
| Integration Polarity | + | − | + | − | + | − | + | − | |
| Signal from Electrode | S | −S | S | −S | S | −S | S | −S | |
| Touch Signal Component | S | S | S | S | S | S | S | S | 8*S |
| Consistent Noise | N | N | N | N | N | N | N | N | |
| Noise Component | N | −N | N | −N | N | −N | N | −N | Zero |

TABLE 1B

| Synchronization signal pulse | Samples | | | | | | | | |
|---|---|---|---|---|---|---|---|---|---|
| | 1 | 2 | 3 | 4 | 5 | 6 | 7 | 8 | SUM |
| Integration Polarity | + | − | + | − | + | − | + | − | |
| Signal from Electrode | S | −S | S | −S | S | −S | S | −S | |
| Touch Signal Component | S | S | S | S | S | S | S | S | 8*S |
| Consistent Noise | −N | −N | −N | −N | −N | −N | −N | −N | |
| Noise Component | −N | N | −N | N | −N | N | −N | N | Zero |

In one embodiment, touch screen controller 106 performs various operations discussed herein such that periodic noise is reduced or eliminated, and such that consistent and random noise is also reduced or eliminated. Periodic noise results, for example, from a circuit causing electromagnetic interference at a frequency related to a clock frequency of the circuit. Display 200 and power supplies are examples of clocked circuits that may create periodic noise, but this disclosure is not limited to noise from display 200 or power supplies and contemplates periodic noise from any source. In some embodiments, the periodic noise component of the received signal is synchronized with a signal associated with a noise source. In one embodiment, the periodic display noise component of the received signal is synchronized with a synchronization signal of display 200.

In one example, touch screen controller 106 receives a synchronization signal from a periodic noise source. Touch screen controller 106 uses the synchronization signal from the periodic noise source as a clock signal to control the frequency at which samples are measured. As further described in reference to FIGS. 7-10, by measuring the samples synchronously to the periodic noise source, touch screen controller 106 can choose a pattern of polarities that reduces or eliminates the periodic noise. The pattern of polarities indicates which polarity of charge will be induced on the electrode when the charging signal is applied for each sample. In one embodiment, touch screen controller 106 measures one sample every clock period of the synchronization signal, which corresponds to a half-period of the periodic noise. However, merely alternating between positive integration and negative integration while measuring the samples may not reduce certain types of periodic noise, such as alternating polarity periodic noise (sometimes referred to as "zebra noise"). In some embodiments, alternating polarity periodic noise is generated when display 200 displays an image that includes a series of alternating rows of pixels respectively having a first color (e.g., black) and a second color (e.g., white). Such an image may be referred to as a zebra image. As further described in reference to FIG. 5A, touch sensor controller 106 chooses a pattern of polarities that includes a certain number of samples of positive polarity, negative polarity, or no polarity in an order that reduces the effects of the certain types of periodic noise on the measurement of the electrode.

As described above, display 200 is one possible source of periodic noise. Due to the close proximity of electrodes 202 and 204 to display 200, touch sensor 104 is particularly susceptible to the periodic noise that occurs in conjunction with displaying images on display 200, such as noise introduced by drive signals provided to the display, for example. As a result, touch sensor controller 106 receives a signal which includes the periodic display noise introduced at electrodes 202 and 204. As described above, when display 200 displays certain images, the periodic noise component of the signal received by touch sensor controller 106 is an alternating polarity periodic display noise component, which is a noise component, generated by display 200, of an electrical signal that alternates between a positive polarity and a negative polarity at a fixed frequency.

To update a display of system 100 (e.g., display 200), controller 106 (or another suitable component of system 100) may use a synchronization signals to control the pixels on display 200. To facilitate locating by the display controller the position corresponding to each pixel data, controller 106 may use a horizontal synchronization (HSYNC) signal to indicate the start of a pixel line. Essentially, the HSYNC signal acts as a clock signal. For example, a start of a new pixel line and can be triggered by the rising edges (e.g., the change from a low level state to a high level state) of the timing pulses of the HSYNC signal. Accordingly, when controller 106 detects the rising edge of one of the timing pulses of the HSYNC signal, the subsequent pixel data received will be interpreted as belonging to the next pixel line. Controller 106 then updates that pixel line. One of ordinary skill in the art will appreciate that in another embodiment, falling edges of the HSYNC pulse can be used by controller 106 to initiate a new pixel line. In certain embodiments, controller 106 uses the HSYNC signal as a synchronization signal for touch sensor measurements.

The following tables illustrate example integration schemes that may be used according to certain embodiments of the present disclosure. Tables 2A-2B below illustrate an eight-sample measurement in which the polarity of the noise alternates, as may occur with noise introduce by drive signals provided to a display for example. In the example illustrated in Tables 2A-2B, one integration per synchronization pulse (e.g., an HSYNC pulse) is performed. In certain embodiments, if the measurement begins on a positive noise phase or a negative noise phase, then the final noise component sum also may be positive or negative, respectively. This example may be referred to as the 1H HSync integration scheme.

TABLE 2A

| Synchronization signal pulse | Samples | | | | | | | | |
| --- | --- | --- | --- | --- | --- | --- | --- | --- | --- |
| | 1 | 2 | 3 | 4 | 5 | 6 | 7 | 8 | SUM |
| Integration Polarity | + | − | + | − | + | − | + | − | |
| Signal from Electrode | S | −S | S | −S | S | −S | S | −S | |
| Touch Signal Component | S | S | S | S | S | S | S | S | 8*S |
| Alternating Noise | N | −N | N | −N | N | −N | N | −N | |
| Noise Component | N | N | N | N | N | N | N | N | 8*N |

TABLE 2B

| Synchronization signal pulse | Samples | | | | | | | | |
| --- | --- | --- | --- | --- | --- | --- | --- | --- | --- |
| | 1 | 2 | 3 | 4 | 5 | 6 | 7 | 8 | SUM |
| Integration Polarity | + | − | + | − | + | − | + | − | |
| Signal from Electrode | S | −S | S | −S | S | −S | S | −S | |
| Touch Signal Component | S | S | S | S | S | S | S | S | 8*S |
| Inverse Alternating Noise | −N | N | −N | N | −N | N | −N | N | |
| Noise Component | −N | −N | −N | −N | −N | −N | −N | −N | −8*N |

Tables 3A-3B below illustrate an eight-sample measurement in which the polarity of the noise alternates, as may occur with noise introduce by drive signals provided to a display for example. In the example illustrated in Tables 3A-3B, one integration per two synchronization pulses (e.g., two HSYNC pulses) is performed. Although this example may cancel alternating noise, the scheme operates at half the burst frequency, which may be a factor in evaluating the appropriateness of this scheme for particular applications. This example may be referred to as the 2H HSync integration scheme.

TABLE 3A

| Synchronization signal pulse | Samples | | | | | | | | |
| --- | --- | --- | --- | --- | --- | --- | --- | --- | --- |
| | 1 | 2 | 3 | 4 | 5 | 6 | 7 | 8 | SUM |
| Integration Polarity | + | | − | | + | | − | | |
| Signal from Electrode | S | | −S | | S | | −S | | |
| Touch Signal Component | S | | S | | S | | S | − | 4*S |
| Alternating Noise | N | −N | N | −N | N | −N | N | −N | |
| Noise Component | N | | −N | | N | | −N | | Zero |

TABLE 3B

| Synchronization signal pulse | Samples | | | | | | | | |
| --- | --- | --- | --- | --- | --- | --- | --- | --- | --- |
| | 1 | 2 | 3 | 4 | 5 | 6 | 7 | 8 | SUM |
| Integration Polarity | + | | − | | + | | − | | |
| Signal from | S | | −S | | S | | −S | | |

TABLE 3B-continued

| Synchronization signal pulse | 1 | 2 | 3 | 4 | 5 | 6 | 7 | 8 | SUM |
|---|---|---|---|---|---|---|---|---|---|
| Electrode Touch Signal Component | S |  | S |  | S |  | S |  | 4*S |
| Inverse Alternating Noise | -N | N | -N | N | -N | N | -N | N |  |
| Noise Component | -N |  | N |  | -N |  | N |  | Zero |

Tables 4A-4B below illustrate an eight-sample measurement in which the polarity of the noise alternates, as may occur with noise introduce by drive signals provided to a display for example. In the example illustrated in Tables 4A-4B, one integration per synchronization pulse (e.g., an HSYNC pulse) is performed, and a phase shift is used. In this example, the phase shift is inserted at the mid-pint of the measurement sequence, so that equal amounts of both phases of the alternating noise are measured. In certain embodiments, inserting the phase shift facilitates reducing or canceling the alternating noise component regardless of the noise phase and at a time cost of only one additional HSync period. This example may be referred to as the 1HP HSync integration scheme.

TABLE 4A

| Synchronization signal pulse | 1 | 2 | 3 | 4 | 5 | 6 | 7 | 8 | 9 | SUM |
|---|---|---|---|---|---|---|---|---|---|---|
| Integration Polarity | + | − | + | − |  | + | − | + | − |  |
| Signal from Electrode | S | -S | S | -S |  | S | -S | S | -S |  |
| Touch Signal Component | S | S | S | S |  | S | S | S | S | 8*S |
| Alternating Noise | N | -N | N | -N | N | -N | N | -N | N |  |
| Noise Component | N | N | N | N |  | -N | -N | -N | -N | Zero |

TABLE 4B

| Synchronization signal pulse | 1 | 2 | 3 | 4 | 5 | 6 | 7 | 8 | 9 | SUM |
|---|---|---|---|---|---|---|---|---|---|---|
| Integration Polarity | + | − | + | − |  | + | − | + | − |  |
| Signal from Electrode | S | -S | S | -S |  | S | -S | S | -S |  |
| Touch Signal Component | S | S | S | S |  | S | S | S | S | 8*S |
| Inverse Alternating Noise | -N | N | -N | N | -N | N | -N | N | -N |  |
| Noise Component | -N | -N | -N | -N |  | N | N | N | N | Zero |

Tables 5A-5B below illustrate an eight-sample measurement in which the polarity of the noise alternates, as may occur with noise introduce by drive signals provided to a display for example. In the example illustrated in Tables 5A-5B, one integration per synchronization pulse (e.g., an HSYNC pulse) is performed, and the integration is a dual polarity integration. In certain embodiments, advantages of this integration pattern are that a phase shift is not used and the likelihood that integrators are overloaded is reduced or eliminated. In certain embodiments, this scheme runs at twice the burst frequency, which may be a factor in evaluating the appropriateness of this scheme for particular applications. This example may be referred to as the 1HD HSync integration scheme.

TABLE 5A

| Synchronization signal pulse | 1 | 2 | 3 | 4 | 5 | 6 | 7 | 8 | SUM |
|---|---|---|---|---|---|---|---|---|---|
| Integration Polarity | + | + | − | − | + | + | − | − |  |
| Signal from Electrode | S | S | -S | -S | S | S | -S | -S |  |
| Touch Signal Component | S | S | S | S | S | S | S | S | 8*S |
| Alternating Noise | N | -N | N | -N | N | -N | N | -N |  |
| Noise Component | N | -N | -N | N | N | -N | -N | N | Zero |

TABLE 5B

| Synchronization signal pulse | 1 | 2 | 3 | 4 | 5 | 6 | 7 | 8 | SUM |
|---|---|---|---|---|---|---|---|---|---|
| Integration Polarity | + | + | − | − | + | + | − | − |  |
| Signal from Electrode | S | S | -S | -S | S | S | -S | -S |  |
| Touch Signal Component | S | S | S | S | S | S | S | S | 8*S |
| Inverse Alternating Noise | -N | N | -N | N | -N | N | -N | N |  |
| Noise Component | -N | N | N | -N | -N | N | N | -N | Zero |

Figure 5A:
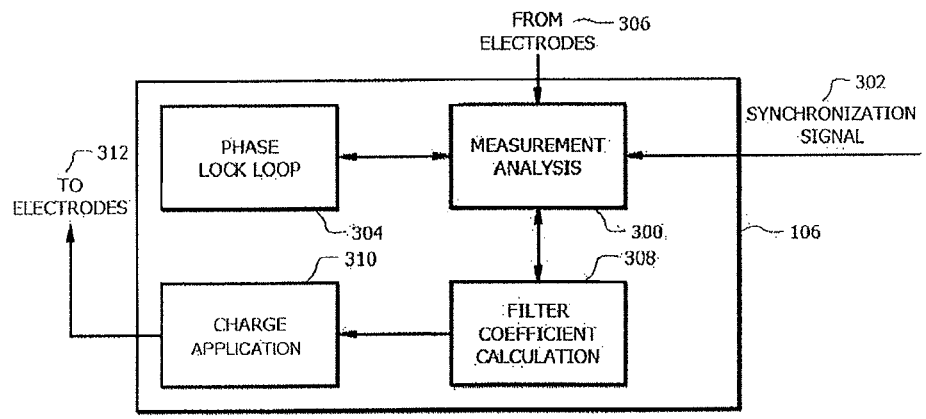
FIG. 5A illustrates a schematic representation of the logical components of an example touch sensor controller, according to an embodiment of the present disclosure.
Figure 5B:
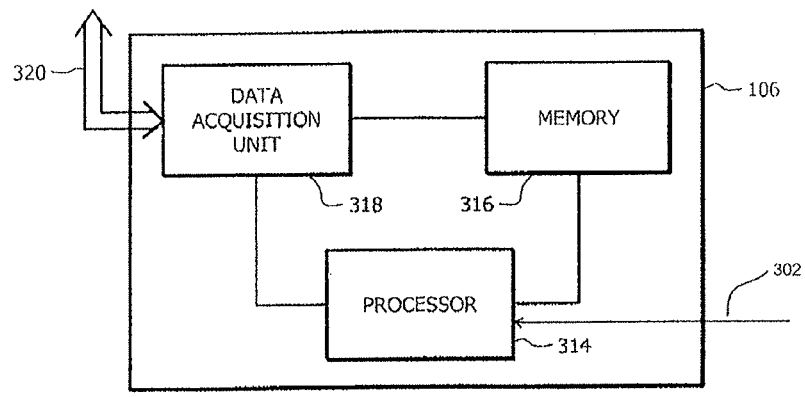
FIG. 5B illustrates a schematic representation of the physical components of an example touch sensor controller, according to an embodiment of the present disclosure.

FIGS. 5A-5B illustrate schematic representations of an example touch sensor controller 106, according to an embodiment of the present disclosure.

FIG. 5A illustrates a schematic representation of the logical components of an example touch sensor controller 106, according to an embodiment of the present disclosure. In the example of FIG. 5A, touch sensor controller 106 includes a measurement analysis module 300, a phase lock loop (PLL) module 304, a filter coefficient calculation module 308, and a charge application module 310. The components of touch sensor controller 106, including measurement analysis module 300, PLL module 304, filter coefficient calculation module 308, and charge application module 310, may be implemented using any combination of hardware, firmware, and software. In an embodiment, these modules consist of logic stored on a computer-readable storage medium that are configured to, when executed by one or more processors of touch sensor controller 106, cause one or more processors to perform operations of touch sensor controller 106.

In one embodiment, measurement analysis module 300 receives a signal from touch sensor 104 through an electrode signal line 306 and a synchronization signal through a synchronization signal line 302 from display 200. Measurement analysis module 300 is coupled to PLL module 304. In an embodiment, measurement analysis module 300 uses synchronization signal line 302 as an external clock to synchronize with display 200. When touch sensor controller 106 is synchronized with display 200, the periodic noise component of the signal received on electrode signal line 306 substantially matches the frequency and phase of synchronization signal line 302.

Measurement analysis module 300 instructs filter coefficient calculation module 308 to select a pattern of polarities that results in a reduction or cancellation of the periodic display noise. In one embodiment, filter coefficient calculation module 308 calculates a filter coefficient pattern, which is a type of pattern of polarities that reduces or cancels multiple periodic noise components of the signal received on electrode signal line 306 when applied to touch sensor 104. In another embodiment, a pattern of polarities from the filter coefficient calculation module 308 provides charge application module 310 of touch sensor controller 106 with a pattern of positive and negative integration sample measurements used to reduce the noise component in the sampled signal, which is calculated after measurement analysis module 300 of touch sensor controller 106 measures a plurality of samples for an electrode. In some embodiments, measurement analysis module 300 instructs charge application module 310 (through filter coefficient calculation module 308) to apply a charging signal to an electrode 202 or 204, during the measurement of each of a plurality of samples for an electrode, using the synchronization signal as a clock signal for each sample. Filter coefficient calculation module 308 informs charge application module 310 which polarity of charge should be induced by the charging signal applied to the electrode 202 or 204, based on the preselected pattern of polarities. Charge application module 310 applies the appropriate charging signal to induce a charge of the specified polarity on the electrode through connecting line 312.

In an embodiment where periodic noise is generated from sources that are not synchronized with the synchronization signal, measurement analysis module 300 analyzes the noise in the received signal received on electrode signal line 306, and determines the spectral characteristics of the noise using PLL module 304 to provide information about the frequencies and phases of the periodic non-display noise. For example, PLL module 304 may be implemented as a control circuit that generates an output signal whose phase is related to the phase of an input signal. Based on the determined spectral characteristics of the noise, filter coefficient calculation module 308 selects a pattern of polarities that results in a reduction or elimination of the periodic non-display noise. Similarly, in an embodiment where a synchronization signal 302 is not provided to touch sensor controller 106, measurement analysis module 300 uses PLL module 304 to provide information about the frequencies and phases of the noise detected in the received signal.

In one embodiment, filter coefficient calculation module 308 selects a pattern of polarities that, when applied by charge application module 310, alters the charging signal applied to an electrode 202 or 204 through electrode connecting line 312 such that the charge induced by the charging signal is the polarity specified by the pattern of polarities. In one example, the polarity of the charge is one of +1, 0, and −1, representing a positive charge, no charge, and a negative charge, respectively. When a pattern of polarities indicates that a sample is to have a polarity of 0, or no charge, filter coefficient calculation module 308 instructs charge application module 310 not to apply a charging signal to the electrode 202 or 204, and further instructs measurement analysis module 300 not to measure the signal received during this sample period. This no charge coefficient results in measurement analysis module 300 of touch sensor controller 106 delaying a clock period of the synchronization signal without taking a sample.

Filter coefficient calculation module 308 selects a pattern of polarities that, once the samples for a certain electrode 202 or 204 have been averaged by measurement analysis module 300, cancels periodic noise received by measurement analysis module 300 from electrode signal line 306. In an embodiment, filter coefficient calculation module 308 chooses a pre-defined pattern of polarities that is designed for noise with a frequency $F_N$, where $F_N$ is a certain proportion of the frequency of the synchronization signal ($F_S$). For example, filter coefficient calculation module 308 may have respective pre-defined patterns of polarities for periodic noise at frequencies $F_S$, $F_S/2$, $F_S/4$, $F_S/5$, and $F_{FS}/10$. In an example where the signal received from touch sensor 104 only contains noise from display 200, the noise from display 200 would be periodic at frequency $F_S$, and filter coefficient calculation module 308 would select the pre-defined pattern of polarities for noise at frequency $F_S$ in order to reduce or eliminate the periodic display noise. In an embodiment where noise has more complicated spectral characteristics, filter coefficient calculation module 308 generates a type of pattern of polarities, called a filter coefficient pattern, based on the spectral analysis conducted by measurement analysis module 300. When generating a filter coefficient pattern, filter coefficient calculation module 308 selects a number of samples to be measured per electrode and calculates a filter coefficient for each sample in order to achieve the best noise reduction or elimination possible. In an embodiment, the number of samples per electrode is between 8 and 64. This disclosure contemplates any number of samples per electrode for pre-determined patterns of polarities and for calculated filter coefficient patterns.

Charge application module 310 applies a charging signal to an electrode 202 or 204. Applying a charging signal involves charge application module 310 applying a voltage to an electrode 202 or 204 through electrode connecting line 312 for a period of time and measurement analysis module 300 analyzing the resulting received signal from touch sensor 104 received on electrode signal line 306. Measurement analysis module 300 averages the measured samples for the electrode 202 or 204 to determine whether an object is capacitively coupled to the electrode 202 or 204. In an embodiment, measurement analysis module 300 measures the voltage of the received signal and compares it to a predetermined voltage threshold. The predetermined voltage threshold is related to the signal received by measurement analysis module 300 when a known charging signal is applied to the electrode 202 or 204, which has a known capacitance. When an object capacitively couples to the electrode 202 or 204, the effective capacitance of the electrode 202 or 204, as measured through the signal received by measurement analysis module 300, is different than when an object is not capacitively coupled, resulting in a different voltage of the received signal. Additionally or alternatively, measurement analysis module 300 may measure the amount of time it takes the voltage of the received signal to reach a predetermined voltage threshold.

FIG. 5B illustrates a schematic representation of the physical components of an example touch sensor controller 106, according to an embodiment of the present disclosure. In the illustrated example, touch sensor controller 106 includes one or more processors 314, one or more memory units 316, and a data acquisition unit 318, wherein each of these three components are coupled to, and operable to communicate information to, the other two components from among these three components. In one embodiment, measurement analysis module 300, PLL module 304, filter coefficient calculation module 308, and charge application module 310 are implemented as instructions stored in the one or more memory units 316. These instructions are accessed from the one or more memory units 316 by the one or more processors 314, and the instructions are executed by the one or more processors 314. As such, it is noted that, in one embodiment, the one or more processors 314 are operable to perform any of the operations performed by measurement analysis module 300, PLL module 304, filter coefficient calculation module 308, and charge application module 310 in FIG. 5A.

While being executed on the one or more processors 314, the instructions cause the one or more processors 314 to send and receive information to and from data acquisition unit 318. Data acquisition unit 318 communicates with touch sensor 104 through connection 320. In some embodiments, the one or more processors 314 comprise data acquisition unit 318, and data acquisition unit 318 represents an interface between the one or more processors 314 and touch sensor 104. In other embodiments, data acquisition unit 318 comprises separate circuitry, hardware, firmware, and software for communication with touch sensor 104. In some embodiments, connection 320 is a bidirectional connection including electrode signal line 306 and electrode connecting line 312. In one embodiment, connection 320 is a single wire. In another embodiment, connection 320 is a bundle of multiple wires. This disclosure contemplates connection 320 being any means to communicate a signal from data acquisition unit 318 to touch sensor 104 and from touch sensor 104 to data acquisition unit 318.

Figure 6:
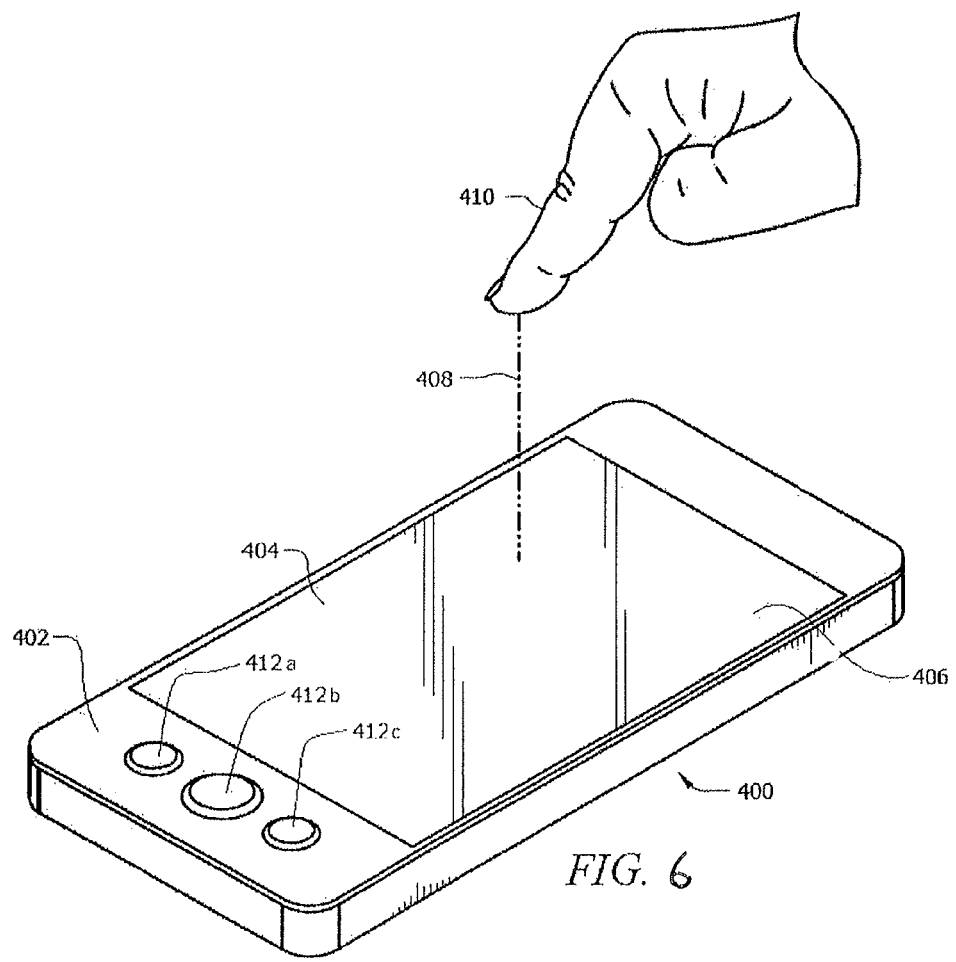
FIG. 6 illustrates an example device that houses a touch sensor, according to an embodiment of the present disclosure.

FIG. 6 illustrates an example device 400 that houses a touch sensor, 104 according to an embodiment of the present disclosure. Device 400 is any personal digital assistant, cellular telephone, smartphone, tablet computer, and the like. In one embodiment, device 400 includes other types of devices, such as automatic teller machines (ATMs), home appliances, personal computers, and any other such device having a touch screen. In the illustrated example, components of system 100 are internal to device 400. Although this disclosure describes a particular device 400 having a particular implementation with particular components, this disclosure contemplates any device 400 having any implementation with any components.

A particular example of device 400 is a smartphone that includes a housing 402 and a touch screen display 404 occupying a portion of a surface 406 of housing 402 of device 400. In an embodiment, housing 402 is an enclosure of device 400, which may contain internal components (e.g., internal electrical components) of device 400. Touch sensor 104 may be coupled, directly or indirectly, to housing 402 of device 400. Touch screen display 404 may occupy a portion or all of a surface 406 (e.g., one of the largest surfaces 406) of housing 402 of device 400. Reference to a touch screen display 404 includes cover layers that overlay the actual display and touch sensor elements of device 400, including a top cover layer (e.g., a glass cover layer). In the illustrated example, surface 406 is a surface of the top cover layer of touch screen display 404. In an embodiment, the top cover layer (e.g., a glass cover layer) of touch screen display 400 is considered part of housing 402 of device 400.

In one embodiment, the size of touch screen display 404 allows the touch screen display 404 to present a wide variety of data, including a keyboard, a numeric keypad, program or application icons, and various other interfaces. In one embodiment, a user interacts with device 400 by touching touch screen display 404 with a stylus, a finger, or any other object in order to interact with device 400 (e.g., select a program for execution or to type a letter on a keyboard displayed on the touch screen display 404). In one embodiment, a user interacts with device 400 using multiple touches to perform various operations, such as to zoom in or zoom out when viewing a document or image. In an embodiment, such as home appliances, touch screen display 404 does not change or changes only slightly during device operation, and recognizes only single touches.

Users may interact with device 400 by physically impacting surface 406 (or another surface) of housing 402 of device 400, shown as impact 408, or coming within a detection distance of touch sensor 104 using an object 410, such as, for example, one or more fingers, one or more styluses, or other objects. In one embodiment, surface 406 is a cover layer that overlies touch sensor 104 and a display of device 400.

Device 400 includes buttons 412, which may perform any purpose in relation to the operation of device 400. One or more of buttons 412 (e.g., button 412b) may operate as a so-called "home button" that, at least in part, indicates to device 400 that a user is preparing to provide input to touch sensor 104 of device 400.

FIGS. 7-10 illustrate example methods of averaging samples, according to embodiments of the present disclosure. For purposes of the example methods described with reference to FIGS. 7-10, it will be assumed that touch sensor controller 106 is configured to operate touch sensor 104 in a mutual capacitance mode and that row electrodes 202 are configured to be driven by touch sensor controller 106 and column electrodes 204 are configured to be sampled by touch sensor controller 106. As described above, the present disclosure contemplates other configurations, including for example column electrodes 204 being driven and row electrodes 202 being sampled in a mutual capacitance mode, as well as touch sensor controller 106 being configured to operate touch sensor 104 in a self capacitance mode in which one or more of row electrodes 202 and column electrodes 204 are configured to be both driven and sampled.

Figure 7:
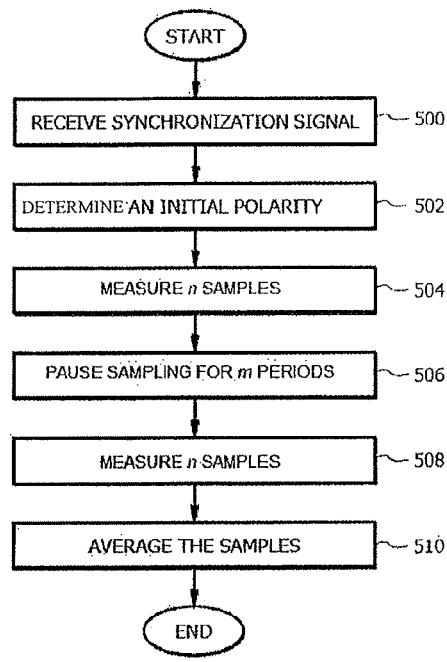
FIG. 7 illustrates a first example method of averaging samples, according to an embodiment of the present disclosure.

FIG. 7 illustrates a first example method of averaging samples, according to an embodiment of the present disclosure. As described in relation to FIG. 6, an object that is capacitively coupled to an electrode of touch sensor 104 may be in physical contact with a surface of device 102, or may be at a proximity within a detection range of touch sensor 104.

At step 500, touch sensor controller 106 receives a periodic synchronization signal from display 200. In one embodiment, the synchronization signal received by touch sensor controller 106 has the same frequency and period of the periodic noise generated by display 200. In an embodiment, the synchronization signal is a square wave sinusoid generated by a clock circuit.

At step 502, touch sensor controller 106 determines an initial polarity for the charging signal of the first sample of the plurality of n samples. The initial polarity may be one of +1, 0, and −1. The initial polarity determines what charging signal is applied to an electrode 202, and thus determines the effect of the recurring display noise on the received signal sampled from an electrode 204, as described above in relation to FIG. 4. For purposes of this example, the electrode 202 to which the charge signal is applied is electrode 202a and the electrode 204 from which the received signal is sampled is electrode 204a.

At step 504, touch sensor controller 106 measures n samples of electrode 204a using the initial polarity when applying a charging signal to electrode 202a. Each sample measurement takes place during one period of the synchronization signal received at step 500. In an embodiment, touch sensor controller 106 measures a sample of the plurality of samples by applying a charging signal of the initial polarity to the electrode 202a for a period of time, measuring a received signal sampled from electrode 204a, and summing the received signal from electrode 204a with a running total of the received signals of the n samples from electrode 204a. In an embodiment, the received signal for each of the n samples is saved in a data structure stored in the one or more memory units 316 of touch sensor controller 106. In an embodiment, the polarity of the integration alternates for each of the n samples. In another embodiment, the polarity of the n samples follows a pre-determined pattern of polarities. In yet another embodiment, the polarity of the touch sensor controller 106 calculates a filter coefficient pattern dynamically for each electrode 202 or 204, based on the periodic noise in the received signal from electrode 204a.

At step 506, sampling is paused for m periods of the synchronization signal. This pause in sampling, also called a phase shift, starts the samples of step 508 at substantially the same time as a phase of an alternating periodic noise component so that the alternating periodic noise component measured through all of the samples is reduced or cancelled. In an embodiment, when sampling is paused, the electrode 202a is not charged, and touch sensor controller 106 skips measuring the received signal. In an embodiment, the number m is an odd number, resulting in an alternating periodic display noise having an opposite polarity on the first sample of step 508 as compared to the first sample of step 504. In certain other embodiments, the number m is an even number, resulting in the alternating periodic display noise being the same polarity in the first sample of step 504 as the first sample of step 508.

At step 508, sampling resumes for n more samples. In an embodiment, the pattern of polarities from step 504 is reversed, which results in each sample of the n samples of step 508 being the opposite polarity of the corresponding sample of step 504. In combination with an appropriate number of pause periods, m, at step 506, reversing the pattern of polarities results in capturing the alternating periodic display noise in a manner that reduces or eliminates the effect of the display noise when determining whether an object has capacitively coupled to a capacitive node formed by electrode 202a and 204a. In another embodiment, the pattern of polarities is the same as the pattern of polarities of step 504, which, in combination with an appropriate number of pause periods, m, at step 506, reduces or eliminates the effect of the alternating periodic display noise when determining whether an object has capacitively coupled with a capacitive node formed by electrodes 202a and 204a. In an embodiment, like at step 504, the received signal for each of the n samples is stored in a data structure stored in the one or more memory units 316 of touch sensor controller 106. In an embodiment, a running sum of all of the 2n samples from steps 504 and 508 is stored in the one or more memory units 316 of touch sensor controller 106.

At step 510, touch sensor controller 106 averages the received signals to determine a sampled result. As described in relation to FIG. 4, in certain embodiments, the negatively integrated samples are inverted prior to step 510. In an embodiment, touch sensor controller 106 averages the received signals by summing all of the received signals of the 2n samples and dividing the total by 2n. In some other embodiments, touch sensor controller 106 tallies a running sum as each sample is measured during steps 504 and 508, and averaging includes dividing the running sum by 2n. Once the average is determined, touch sensor controller 106 compares the average to a predetermined threshold, and touch sensor controller 106 determines whether an object is capacitively coupled with the electrode 204a based on the result of the comparison of the average to the predetermined threshold.

Figure 8:
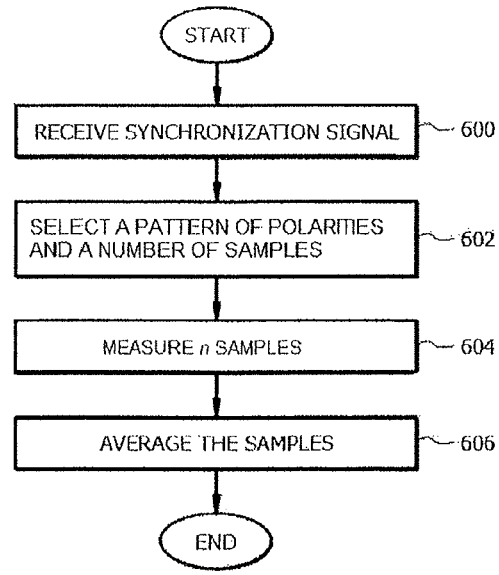
FIG. 8 illustrates a second example method of averaging samples, according to an embodiment of the present disclosure.

FIG. 8 illustrates a second example method of averaging samples, according to an embodiment of the present disclosure. At step 600, touch sensor controller 106 receives a synchronization signal from display 200. In one embodiment, the synchronization signal received by touch sensor controller 106 has the same frequency and period of the periodic noise generated by display 200. In an embodiment, the synchronization signal is a square wave sinusoid generated by a clock circuit At step 602, touch sensor controller 106 determines a pattern of polarities and a number of samples. As an example, if the pattern of polarities selected is + followed by − (where + represents positive integration and − represents negative integration), and the number of samples is 4, the four samples would be +,−,+,−. As another example, if the pattern of polarities is +,+ followed by −,−, and the number of samples is 8, the eight samples would be +,+,−,−,+,+,−,−.

In one embodiment, the pattern of polarities is selected based on the frequencies and phases of the noise components in the received signal. The pattern of polarities and the number of samples create a set of polarities for the plurality of samples to be used to apply a charging signal to the electrode 202 and measure the received signal from an electrode 204 of touch sensor 104. For purposes of this example, the electrode 202 to which the charge signal is applied is electrode 202a and the electrode 204 from which the received signal is sampled is electrode 204a. In an embodiment, the pattern of polarities and the number of samples are selected by touch sensor controller 106 from a plurality of predetermined patterns of polarities, each created to reduce or eliminate the effect of periodic noise with specific spectral characteristics, as described above in relation to FIG. 5A. In an embodiment, multiple predetermined patterns of polarities that reduce or eliminate the effect of periodic non-display noise while also reducing or eliminating the effect of alternating periodic display noise are stored in the one or more memory units 316 of touch sensor controller 106.

At step 604, touch sensor controller 106 uses the set of polarities for the plurality of samples calculated from the pattern of polarities and the number of samples to measure n samples of the electrode 204a n times, where n is the number of samples used in calculating the set of polarities. Touch sensor controller 106 measures a sample by applying a charging signal to the electrode 202a based on the prescribed polarity from the set of polarities, and measuring a received signal from electrode 204a of touch sensor 104. In an embodiment, as described in relation to FIG. 7, the received signals are stored in one or more memory units 316 of touch sensor controller 106, including, in some embodiments, a running sum of the received signals.

At step 606, touch sensor controller 106 calculates a sampled result of the n samples by retrieving the running sum of the received signals and dividing the running sum by the number of samples, n. Touch sensor controller 106 compares the sampled result to a predetermined threshold, and touch sensor controller 106 determines whether an object is capacitively coupled to a capacitive node formed by electrodes 202a and 204a. In an embodiment, the predetermined threshold is a voltage level that, if equaled or surpassed by the sampled result, results in touch sensor controller 106 determining that an object is capacitively coupled to a capacitive node formed by electrodes 202a and 204a. In some other embodiments, the predetermined threshold is a time period required to reach a threshold voltage level that, if equaled or surpassed by the sampled result, results in touch sensor controller 106 determining that an object is capacitively coupled to a capacitive node formed by electrodes 202a and 204a.

Figure 9:
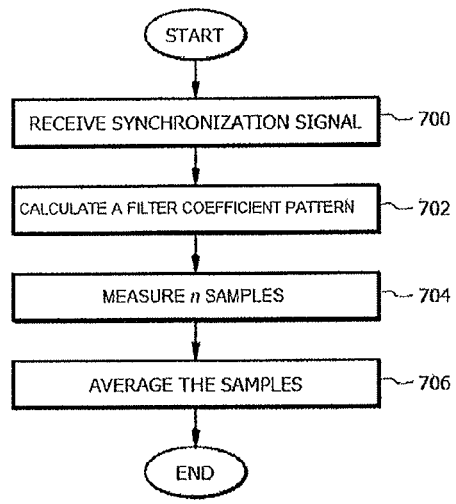
FIG. 9 illustrates a third example method of averaging samples, according to an embodiment of the present disclosure.

FIG. 9 illustrates a third example method of averaging samples, according to an embodiment of the present disclosure. At step 700, touch sensor controller 106 receives a synchronization signal from display 200. In one embodiment, the synchronization signal received by touch sensor controller 106 has the same frequency and period of the periodic noise generated by display 200. In an embodiment, the synchronization signal is a square wave sinusoid generated by a clock circuit.

At step 702, touch sensor controller 106 calculates a filter coefficient pattern. Although a filter coefficient pattern is described in relation to the example of FIG. 9, this disclosure contemplates substituting any pattern of polarities in place of the filter coefficient pattern in the example of FIG. 9. In an embodiment, the filter coefficient pattern is calculated to reduce or eliminate the effect of the alternating periodic display noise and other periodic noise. The filter coefficient pattern is calculated to reduce or eliminate the noise without creating (or while minimizing) harmonic interference related to the reduced or eliminated noise. In an embodiment, the filter coefficient pattern is calculated using between 8 and 32 samples. In certain other embodiments, the filter coefficient pattern is calculated using any number of samples to reduce or eliminate the effect of the noise. The filter coefficient pattern is calculated to reduce or eliminate multiple components of noise, each having unique frequency and phase characteristics compared to other noise components.

The filter coefficient pattern may be determined in any suitable manner for reducing or eliminating the effect of alternating periodic display noise or other periodic noise. A touch measurement system may average a sequence of integration measurements of alternating polarity which can be regarded as a digital finite impulse response (FIR) filter with respect to noise. In certain embodiments, a 1H HSYNC integration scheme may have an equivalent noise measurement filter as follows.

$$h_{1H} = \{1, -1, 1, -1, \ldots, 1-1, 1, -1\}$$

It can be shown that the frequency response for the 1H HSYNC integration scheme may be as follows, $$|H_{1H}(k)|^2 = \frac{1}{N}(1 - \cos 2\pi k)\left(\frac{1}{2} + \sum_{n=1}^{N-1}\left(\frac{N-n}{N}\right)\cos 4\pi nk\right),$$

where N is the number of pairs of positive and negative integration measurements used in the averaging, and k is the frequency normalized to the sampling rate, equivalent to twice the burst frequency. In certain embodiments, the burst frequency is the largest peak in the 1H spectrum and corresponds to the Nyquist frequency (e.g., approximately half of the sampling rate) of the touch measurement system.

For the 1HP HSYNC integration scheme, an equivalent noise measurement filter may be implemented as follows, where the coefficient value of zero at the filter mid-point represents a phase shift (if used), $$h_{1HP} = \{1, -1, 1-1, \ldots, 1, -1, 0, 1, -1, \ldots, 1, -1, 1-1\}$$

It can be shown that the frequency response for the 1HP scheme may be as follows, $$|H_{1HP}(k)|^2 = \frac{1}{N}(1 + \cos\pi(N+1)k)(1 - \cos 2\pi k)\left(\frac{1}{2} + \sum_{n=1}^{\frac{N}{2}-1}\left(\frac{N-2n}{N}\right)\cos 4\pi nk\right)$$

By generalizing the equivalent measurement digital filter it is possible to select filter coefficients that simultaneously reduce or cancel alternating noise and spread the noise resonant frequencies, the benefit of which may be a measurement system that is less susceptible to random interfering noise.

In one example, the filter coefficients for $h_{1HR}$ is calculated by searching through possible combinations of coefficients and selecting a set that has the minimum magnitude resonant frequency spectrum and that is able to best reduce or cancel alternating noise. To limit the search space, a phase shift may be inserted at the mid-point in the filter and the second half of the filter may be an inverted and reversed version $\overleftarrow{h}$ of the first half $\vec{h}$.

$$h_{1HR} = \{\vec{h}, 0, -\overleftarrow{h}\}$$

Although a particular filter design is described, the present disclosure contemplates using any suitable filter design, including for example $\{\vec{h}, 0, \overleftarrow{h}\}$ and $\{\vec{h}, 0, \vec{h}\}$. In some scenarios with the 1HR HSYNC integration scheme, the maximum burst frequency is double that of the 1H HSYNC and 1HP HSYNC integration schemes. Some touch sensors are designed to operate at the fastest possible frequency, so in some embodiments, to address the potentially longer maximum burst frequency with the 1HR HSYNC integration scheme, the length of $h_{1HR}$ filter could be reduced.

Although the present disclosure describes particular techniques for determining the filter coefficient pattern, the present disclosure contemplates determining the filter coefficient pattern in any suitable manner, according to particular needs.

At step 704, touch sensor controller 106 measures n samples of electrode 202 or 204, where n is the number of samples of the filter coefficient pattern. For purposes of this example, the electrode 202 to which the charge signal is applied is electrode 202a and the electrode 204 from which the received signal is sampled is electrode 204a. In an embodiment, touch sensor controller 106 measures a sample of the electrode 204a by applying a charging signal to electrode 202a with a polarity defined by the filter coefficient pattern. Touch sensor controller 106 measures a received signal from electrode 204a of touch sensor 104, and saves the measured signal in a data structure stored in one or more memory units 316. Then, touch sensor controller 106 sums the stored received signals from the n samples into a running sum, which is also stored in the one or more memory units 316.

At step 706, touch sensor controller 106 averages the n samples by dividing the running sum of the n samples by n, the number of samples to obtain a sampled result. Touch sensor controller 106 compares the sampled result to a predetermined threshold to determine whether an object has capacitively coupled to a capacitive node formed by electrodes 202a and 204a. In an embodiment, the predetermined threshold is a voltage level that, if equaled or surpassed by the sampled result, results in touch sensor controller determining that an object is capacitively coupled to a capacitive node formed by electrodes 202a and 204a. In some other embodiments, the predetermined threshold is a time period required to reach a threshold voltage level that, if equaled or surpassed by the sampled result, results in touch sensor controller 106 determining that an object is capacitively coupled to a capacitive node formed by electrodes 202a and 204a.

Figure 10:
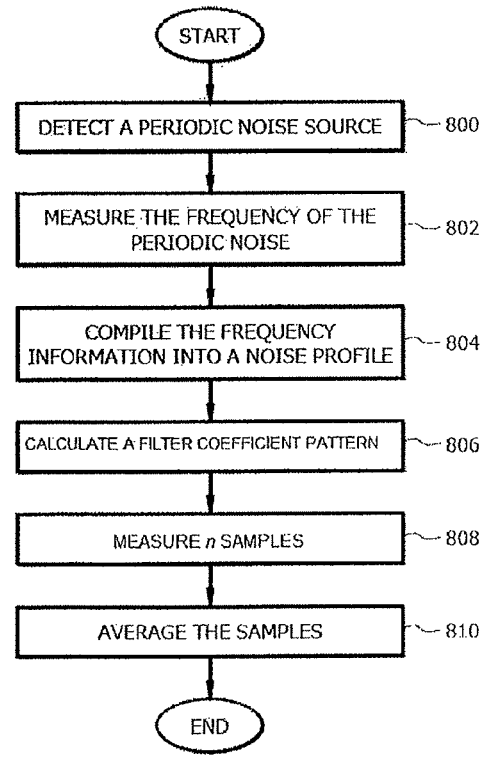
FIG. 10 illustrates a fourth example method of averaging samples, according to an embodiment of the present disclosure.

FIG. 10 illustrates a fourth example method of averaging samples, according to an embodiment of the present disclosure. In the example of FIG. 10, an alternate embodiment of a method for measuring whether an object is capacitively coupled to a capacitive node formed by electrode 202 and/or 204 of touch sensor 104 is described. At step 800, touch sensor controller 106 detects a periodic noise source. In an embodiment, multiple periodic noise sources are detected, each noise source having a different frequency and phase than the other detected noise sources. In an embodiment, one periodic noise source that is detected is the alternating periodic display noise. The alternating periodic display noise is detected separately from periodic non-display noise.

In response to touch sensor controller 106 detecting the one or more periodic noise sources, at step 802 touch sensor controller 106 measures the frequency and phase of each periodic noise source. In an embodiment, the frequency and phase of each periodic noise source is measured using a phase lock loop (PLL) module 304 of touch sensor controller 106. In some embodiments where the alternating periodic display noise is detected and a synchronization signal is provided to touch sensor controller 106, the frequency and phase of the alternating periodic display noise is measured using the synchronization signal. In an embodiment, further characteristics of each noise component are measured, such as the peak amplitude.

At step 804, touch sensor controller 106 compiles the measured characteristics of the detected noise sources into an environment noise profile. In an embodiment, the environment noise profile includes a representation of the spectral characteristics of each noise component. The environment noise profile includes a data structure that is used by touch sensor controller 106 to calculate filter coefficient patterns.

At step 806, touch sensor controller 106 uses the environment noise profile to calculate a filter coefficient pattern. The filter coefficient pattern is calculated to reduce or eliminate the noise components represented in the environment noise profile by selecting the polarities of the samples to reduce or eliminate noise with characteristics the same as or similar to the measured characteristics of the detected noise sources. Although a filter coefficient pattern is described in relation to the example of FIG. 10, this disclosure contemplates substituting any pattern of polarities in place of the filter coefficient pattern in the example of FIG. 10.

In an embodiment, touch sensor controller 106 calculates a fixed number of filter coefficients, with the resulting coefficients being calculated to reduce or eliminate the effect of periodic noise on the measured samples. The fixed number of coefficients is calculated taking into account major harmonics, and, due at least in part to suppressing noise components at a certain frequency, reducing or eliminating generation of the major harmonics. In certain other embodiments, the number of filter coefficients is not predetermined, but instead calculated in real time, where the number of coefficients is calculated to best reduce or eliminate the effect of the periodic noise and resulting noise at harmonic frequencies. In one embodiment, the number of filter coefficients in the filter coefficient pattern is restricted to between 4 and 32 coefficients, resulting in between 4 and 32 samples. By restricting the number of filter coefficients, touch sensor controller 106 reduces the longest amount of time it takes to calculate the filter coefficients. However, by restricting the number of filter coefficients, touch sensor controller 106 may reduce the effectiveness of the filter coefficient pattern on reducing or cancelling the noise components. In another embodiment, the number of filter coefficients in the filter coefficient pattern is not restricted, and the calculation of the filter coefficients takes into account the time cost associated with using additional filter coefficients.

At step 808, touch sensor controller 106 uses the filter coefficient pattern to measure n samples of the electrode 204a, where n is the number of filter coefficients calculated at step 806. In an embodiment, n is a fixed number, such that all electrodes 202 or 204 are measured for n samples each time touch sensor controller 106 measures electrodes 202 or 204 of touch sensor 104. In some other embodiments, n is a variable number such that each electrode 202 or 204 is measured for $n_1$ samples on measurement of the electrodes, but each electrode 202 or 204 is measured for a different number $n_2$ samples on another measurement of the electrodes. In certain other embodiments, n is a dynamically variable number such that a first electrode 202 or 204 is measured for $n_1$ samples and a second electrode 202 or 204 is measured for $n_2$ samples on the same measurement of the electrodes.

Measuring a sample includes applying a charging signal to the electrode 202 or 204 (e.g., electrode 202a) based on the prescribed polarity from the filter coefficient pattern, and measuring a received signal from an electrode 202 or 204 (e.g., electrode 204a) of touch sensor 104. In an embodiment, as described in relation to FIG. 7, the received signals are stored in one or more memory units 316 of touch sensor controller 106, including, in some embodiments, a running sum of the received signals.

At step 810, touch sensor controller 106 averages the n samples by dividing the running sum of the n samples by n, the number of samples to obtain a sampled result. Then, touch sensor controller 106 compares the sampled result to a predetermined threshold to determine whether an object has capacitively coupled to a capacitive node formed by electrodes 202a and 204a. In an embodiment, the predetermined threshold is a voltage level that, if equaled or surpassed by the sampled result, results in touch sensor controller 106 determining that an object is capacitively coupled to a capacitive node formed by electrodes 202a and 204a. In some other embodiments, the predetermined threshold is a time period required to reach a threshold voltage level that, if equaled or surpassed by the sampled result, results in touch sensor controller 106 determining that an object is capacitively coupled to a capacitive node formed by electrodes 202a and 204a.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Herein, reference to a computer-readable storage medium encompasses one or more non-transitory, tangible computer-readable storage media possessing structure. As an example and not by way of limitation, a computer-readable storage medium may include a semiconductor-based or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A non-transitory computer-readable medium comprising logic, the logic configured to, when executed by one or more processors, cause the one or more processors to perform operations comprising:
   measuring a plurality of samples from a touch sensor, wherein measuring each sample comprises:
      determining, based on a first pattern of polarities, a polarity of a charging signal to be applied to an electrode of the touch sensor;
      applying the charging signal to the electrode of the touch sensor, the charging signal, as applied, having the polarity determined based on the first pattern of polarities; and
      measuring a received signal from the touch sensor, the received signal resulting, at least in part, from the charging signal applied to the electrode; and
   determining whether a touch event has occurred at a capacitive node formed at the electrode of the touch sensor by analyzing the received signals from the plurality of samples;
   wherein measuring the plurality of samples comprises:
      applying a plurality of charging signals to a first portion of the plurality of samples based on the first pattern of polarities; and
      applying, following a predetermined number of pause periods, a plurality of charging signals to a second portion of the plurality of samples based on a second pattern of polarities, the second pattern of polarities being based at least in part on the predetermined number of pause periods.

2. The non-transitory computer-readable medium of claim 1, wherein the first pattern of polarities is based on a periodic synchronization signal to which a periodic noise component is synchronized.

3. The non-transitory computer-readable medium of claim 2, wherein the plurality of samples are measured at a same frequency and phase as the periodic synchronization signal such that a sample is measured during consecutive half-periods of the periodic noise component.

4. The non-transitory computer-readable medium of claim 2, wherein measuring the plurality of samples comprises:
   measuring the first portion of the plurality of samples during consecutive periods of the periodic synchronization signal;
   delaying measurement of a sample for the predetermined number of pause periods of the periodic synchronization signal; and
   measuring the second portion of the plurality of samples during consecutive periods of the periodic synchronization signal following the delay.

5. The non-transitory computer-readable medium of claim 1, wherein the first pattern of polarities is the same as the second pattern of polarities.

6. The non-transitory computer-readable medium of claim 1, wherein each polarity of the first pattern of polarities is opposite in polarity to each corresponding polarity of the second pattern of polarities.

7. The non-transitory computer-readable medium of claim 2, wherein:
   a display screen is synchronized to the periodic synchronization signal; and
   the periodic noise component is generated by the display screen.

8. The non-transitory computer-readable medium of claim 1, wherein analyzing the received signals of the first portion of the plurality of samples comprises:
   summing the received signals of the first portion of the plurality of samples to obtain a running sum;
   dividing the running sum by a number of samples of the first portion to obtain a sampled result; and
   conducting a comparison to compare the sampled result to a predetermined threshold; and
   determining whether the touch event has occurred based on the comparison.

9. A method, comprising:
   measuring a plurality of samples from a touch sensor, wherein measuring each sample comprises:
      determining, based on a first pattern of polarities, a polarity of a charging signal to be applied to an electrode of the touch sensor;
      applying the charging signal to the electrode of the touch sensor, the charging signal, as applied, having the polarity determined based on the first pattern of polarities; and
      measuring a received signal from the touch sensor, the received signal resulting, at least in part, from the charging signal applied to the electrode; and determining whether a touch event has occurred at the electrode of the touch sensor by analyzing the received signals from the plurality of samples;

wherein measuring the plurality of samples comprises:
applying a plurality of charging signals to a first portion of the plurality of samples based on the first pattern of polarities; and
applying, following a predetermined number of pause periods, a plurality of charging signals to a second portion of the plurality of samples based on a second pattern of polarities, the second pattern of polarities being based at least in part on the predetermined number of pause periods.

10. The method of claim 9, wherein the first pattern of polarities is based on a periodic synchronization signal to which a periodic noise component is synchronized.

11. The method of claim 10, wherein the plurality of samples are measured at a same frequency and phase as the periodic synchronization signal such that a sample is measured during consecutive half-periods of the periodic noise component.

12. The method of claim 10, wherein measuring the plurality of samples comprises:
measuring the first portion of the plurality of samples during consecutive periods of the periodic synchronization signal;
delaying measurement of a sample for the predetermined number of pause periods of the periodic synchronization signal; and
measuring a second portion of the plurality of samples during consecutive periods of the periodic synchronization signal following the delay.

13. The method of claim 9, wherein the first pattern of polarities is the same as the second pattern of polarities.

14. The method of claim 9, wherein each polarity of the first pattern of polarities is opposite in polarity to each corresponding polarity of the second pattern of polarities.

15. The method of claim 9, wherein analyzing the received signals of the first portion of the plurality of samples comprises:
summing the received signals of the first portion of the plurality of samples to obtain a running sum;
dividing the running sum by a number of samples of the first portion to obtain a sampled result;
conducting a comparison to compare the sampled result to a predetermined threshold; and
determining whether the touch event has occurred based on the comparison.

16. An apparatus, comprising:
one or more processors; and
one or more memory units coupled to the one or more processors, the one or more memory units collectively storing logic configured to, when executed by the one or more processors, cause the one or more processors to perform operations comprising:
measuring a plurality of samples from a touch sensor, wherein measuring each sample comprises:
determining, based on a first pattern of polarities, a polarity of a charging signal to be applied to an electrode of the touch sensor;
applying the charging signal to the electrode of the touch sensor, the charging signal, as applied, having the polarity determined based on the first pattern of polarities; and
measuring a received signal from the touch sensor, the received signal resulting, at least in part, from the charging signal applied to the electrode; and
determining whether a touch event has occurred at the electrode of the touch sensor by analyzing the received signals from the plurality of samples;

wherein measuring the plurality of samples comprises:
applying a plurality of charging signals to a first portion of the plurality of samples based on the first pattern of polarities; and
applying, following a predetermined number of pause periods, a plurality of charging signals to a second portion of the plurality of samples based on a second pattern of polarities, the second pattern of polarities being based at least in part on the predetermined number of pause periods.

17. The apparatus of claim 16, wherein the first pattern of polarities is based on a periodic synchronization signal to which a periodic noise component is synchronized.

18. The apparatus of claim 17, wherein measuring the plurality of samples comprises:
measuring a first portion of the plurality of samples during consecutive periods of the periodic synchronization signal;
delaying measurement of a sample for the predetermined number of pause periods of the periodic synchronization signal; and
measuring a second portion of the plurality of samples during consecutive periods of the periodic synchronization signal following the delay.

19. The apparatus of claim 16, wherein the first pattern of polarities is the same as the second pattern of polarities.

20. The apparatus of claim 16, wherein each polarity of the first pattern of polarities is opposite in polarity to each corresponding polarity of the second pattern of polarities.

* * * * *